United States Patent
Kobayashi

(10) Patent No.: US 9,243,522 B2
(45) Date of Patent: Jan. 26, 2016

(54) VALVE TIMING CONTROLLER

(71) Applicant: AISIN SEIKI KABUSHIKI KAISHA, Kariya-shi (JP)

(72) Inventor: Masaki Kobayashi, Okazaki (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 14/405,288

(22) PCT Filed: Jun. 4, 2013

(86) PCT No.: PCT/JP2013/065482
§ 371 (c)(1),
(2) Date: Dec. 3, 2014

(87) PCT Pub. No.: WO2013/187284
PCT Pub. Date: Dec. 19, 2013

(65) Prior Publication Data
US 2015/0114329 A1    Apr. 30, 2015

(30) Foreign Application Priority Data
Jun. 14, 2012    (JP) .................................. 2012-135166

(51) Int. Cl.
*F01L 1/34*    (2006.01)
*F01L 1/344*    (2006.01)
(Continued)

(52) U.S. Cl.
CPC ............... *F01L 1/344* (2013.01); *F01L 1/3442* (2013.01); *F01L 1/356* (2013.01); *F02D 13/02* (2013.01);
(Continued)

(58) Field of Classification Search
CPC ................... F01L 1/344; F01L 1/3442; F01L 2001/34423; F01L 2001/3445; F01L 2001/34476
USPC ............................................ 123/90.15, 90.17
See application file for complete search history.

(56) References Cited

U.S. PATENT DOCUMENTS 7,444,964 B2 * 11/2008 Kanada ..................... F01L 1/34
123/90.15
2005/0016481 A1    1/2005 Komazawa et al.
(Continued)

FOREIGN PATENT DOCUMENTS

JP    2003-172110 A    6/2003
JP    2004-257313 A    9/2004
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Dec. 24, 2014, by the International Bureau of WIPO in corresponding International Application No. PCT/JP2013/065482. (6 pages).
(Continued)

*Primary Examiner* — Ching Chang
(74) *Attorney, Agent, or Firm* — Buchanan Ingersoll & Rooney PC

(57) ABSTRACT

Provided is a valve timing controller capable of quickening a response in varying a relative rotational phase. When the valve timing controller is under a locking state, if an ECU outputs a phase maintenance signal indicative of a phase maintaining state wherein control for maintaining the relative rotational phase within a predetermined range by work fluid present in an advancing chamber and a retarding chamber is possible, an intermediate locking mechanism is switched to a lock-releasing state and also the relative rotational phase is maintained to an intermediate locking state.

4 Claims, 7 Drawing Sheets

(51) Int. Cl.
  *F02D 13/02*  (2006.01)
  *F01L 1/356*  (2006.01)

(52) U.S. Cl.
  CPC ..... *F02D 13/0219* (2013.01); *F01L 2001/3445* (2013.01); *F01L 2001/34423* (2013.01); *F01L 2001/34466* (2013.01); *F01L 2001/34473* (2013.01); *F01L 2001/34476* (2013.01); *Y02T 10/18* (2013.01)

(56) References Cited

U.S. PATENT DOCUMENTS

2007/0266976 A1  11/2007  Nagashima
2012/0017857 A1   1/2012  Kato et al.

FOREIGN PATENT DOCUMENTS

JP    2007-332957 A    12/2007
JP     2012-26275 A     2/2012

OTHER PUBLICATIONS

International Search Report (PCT/ISA/210) mailed on Aug. 13, 2013, by the Japanese Patent Office as the International Searching Authority for International Application No. PCT/JP2013/065482.
Written Opinion (PCT/ISA/237) mailed on Aug. 13, 2013, by the Japanese Patent Office as the International Searching Authority for International Application No. PCT/JP2013/065482.

* cited by examiner

VALVE TIMING CONTROLLER

TECHNICAL FIELD

This invention relates to a valve timing controller for controlling a relative rotational phase of a driven-side rotary member relative to a driving-side rotary member rotated in synchronism with a crankshaft of an internal combustion engine.

BACKGROUND ART

In recent years, a valve timing controller enabling varying of opening/closing timings of an intake valve and an exhaust valve in accordance with an operational state of an internal combustion engine (may be referred to also as "engine" hereinafter) has been put into practical use. This valve timing controller has a function of varying the opening/closing timings of the intake and exhaust valves opened/closed in association with rotation of a driven-side rotary member by e.g. changing the relative rotational phase of the driven-side rotary member relative to rotation of the driving-side rotary member caused by an operation of the engine.

In general, the optimal opening/closing timings of intake and exhaust valves differ, depending on an operational state of the engine such as engine start-up, vehicle run, etc. Then, at the time of engine start-up for instance, by restraining the relative rotational phase of the driven-side rotary member relative to rotation of the driving-side rotary member to a predetermined phase between a most advanced phase and a most retarded phase, opening/closing timings of the intake and exhaust valves optimal for the engine start-up are realized and generation of hitting noise by pivotal displacement of a partitioning portion of a fluid pressure chamber formed by the driving-side rotary member and the driven-side rotary member is restricted at the same time. After the engine start-up, the relative rotational phase is maintained under the restrained state for the purpose of warm-up for instance, while the vehicle stays stopped. But, when the vehicle is caused to run, the restrained state will be released since there now arises a need to change the relative rotational phase.

In PTL 1, there is disclosed a valve timing controller having a plurality of rotational phase restricting mechanisms configured to allow relative rotation which causes a relative rotational phase between an outer rotor and an inner rotor to approach a locking phase, but restricts relative rotation which causes the relative rotational phase to depart from the locking phase. With this valve timing controller, the relative rotational phase is at the most retarded phase at the time of engine stop, but not locked to this phase. At the time of engine startup, the relative rotational phase is varied from the most retarded phase to the phase advancing side due to cranking of the crankshaft and is restrained to a locking phase which is a phase between the most retarded phase and the most advanced phase. Thereafter, the locking will be released when the relative rotational phase is to be changed.

CITATION LIST

Patent Literature

PTL 1: Japanese Unexamined Patent Application Publication No. 2004-257313

SUMMARY OF INVENTION

Technical Problem

With the valve timing controller disclosed in PTL 1, when the relative rotational phase between the outer rotor and the inner rotor is under the locked state (e.g. at the time of idling), if a driver steps on an accelerator pedal to start a normal operation, the controller effects a control operation to change the relative rotational phase to the advancing side. Specifically, a signal indicative of detection of a degree of opening of the accelerator caused by the driver's stepping action is inputted to an electronic control unit ECU, so that the ECU executes a control operation for bringing a spool position of an oil control valve OCV to W2 in accordance with this detection signal. When the spool position of the OCV is put to W2, an amount of work oil is supplied to a groove and an advancing chamber, whereby a movable body is retracted from the groove to release the locked state and the relative rotational phase is changed to the advancing side.

FIG. 7 shows a timing chart illustrating controlling from start to a normal operation of an engine E, of a phase control valve 24 controlling of a release control valve 25, displacements of the relative rotational phase and states of an intermediate locking mechanism L. As shown in this FIG. 7, immediately after a stepping-on action on the accelerator by the driver, the phase control valve and the release control valve are switched over therebetween, whereupon work oil is supplied to the groove engaged with the locking member and the advancing chamber. And, when the groove and the advancing chamber are filled with the work oil, the locked state of the intermediate locking mechanism is released, whereby the relative rotational phase is changed to the advancing side. A certain amount of time is required after the switchover of the phase control valve and the release control valve until the filling of the groove and the advancing chamber with the work oil. Therefore, a time lag occurs during the period from the stepping-on of the accelerator to actual displacement of the relative rotational phase from the intermediate locking phase to the advancing side, i.e. until acceleration of the vehicle is started, so that the accelerator response (may be referred to simply as "response" hereinafter, when appropriate) may be poor.

Moreover, with the valve timing controller disclosed in PTL 1 of the type wherein a plate-like locking member is caused to protrude/retract along the radial direction of the inner rotor, another problem would occur as follows. Namely, when a centrifugal force generated by engine rotation exceeds an urging force of a spring applied to the locking member, in spite of absence of work oil supply to the groove, the locking member can erroneously exit the groove to release the locked state inadvertently, whereby an erroneous displacement of the relative rotational phase occurs. For this reason, according to a conventional arrangement, the locking member under the engaged state is pressed against the end of the groove with a shearing force generated by the oil pressure of the work oil, so that a resultant frictional force generated between the locking member and the groove may prevent inadvertent exit/retraction of the locking member. When the temperature of the work oil (to be referred to as "oil temperature" hereinafter) is low, the oil pressure is high and the shearing force is large, so that the frictional force too is large and the erroneous exit will hardly occur. However, as the oil temperature rises, the oil pressure drops correspondingly, thus causing corresponding reduction in the shearing force. Thus, a sufficient frictional force cannot be obtained from the shearing force relying on the oil pressure, so the prevention of erroneous exit becomes insufficient.

In view of the above-described problems, an object of the present invention is to provide a valve timing controller capable of quickening the response in varying the relative rotational phase.

Solution to Problem

For accomplishing the above-noted object, according to a characterizing feature of a valve timing controller relating to the present invention, the valve timing controller comprises:

a driving-side rotary member rotated in synchronism with a crankshaft of an internal combustion engine;

a driven-side rotary member mounted on a same shaft as the driving-side rotary member and rotated in synchronism with a valve opening/closing cam shaft of the internal combustion engine;

a fluid pressure chamber formed by the driving-side rotary member and the driven-side rotary member;

an advancing chamber and a retarding chamber formed as the fluid pressure chamber is partitioned by a partitioning portion provided in at least one of the driving-side rotary member and the driven-side rotary member;

an intermediate locking mechanism including a locking member accommodated in at least one rotary member of the driving-side rotary member and the driven-side rotary member and projectable/retractable to/from the other rotary member of the driving-side rotary member and the driven-side rotary member, and a recess portion formed in the other rotary member to be engageable with the locking member when this locking member projects, the intermediate locking mechanism being switchable between a locking state wherein a relative rotational phase of the driven-side rotary member relative to the driving-side rotary member is restrained to an intermediate locking phase between a most retarded phase and a most advanced phase and a lock-releasing state wherein the restraint is released as the locking member retracts from the recess portion; and a controlling section for controlling supplying/discharging of the work fluid to/from the advancing chamber and supplying/discharging of the work fluid to/from the retarding chamber;

wherein when the controlling section outputs a phase maintenance signal indicating a phase maintaining state which allows control for maintaining the relative rotational phase within a predetermined angle range by the work fluid present in the advancing chamber and the retarding chamber under the locking state, the intermediate locking mechanism is switched to the lock-releasing state and the relative rotational phase is maintained to the intermediate locking phase.

With the above-described characterizing feature, even after the intermediate locking mechanism is rendered into the lock-releasing state, the relative rotational phase is maintained to the intermediate locking phase. As there is no need to release locking after the driver steps on the accelerator, the relative rotational phase is displaced from the intermediate locking phase toward the advancing side immediately after stepping-on of the accelerator. Therefore, no time lag occurs after the stepping-on of the accelerator until displacement of the relative rotational phase, so favorable accelerator response can be obtained.

In the valve timing controller relating to the present invention, preferably, the controlling section outputs the phase maintenance signal when a temperature of the work fluid exceeds a predetermined temperature.

With the above arrangement, no time lag occurs after the stepping-on of the accelerator until displacement of the relative rotational phase, so favorable accelerator response can be obtained. Moreover, in the case of the valve timing controller of the type wherein a plate-like locking member is caused to protrude/retract along the radial direction of the inner rotor, it is possible to release the locking and to maintain the relative rotational phase to the intermediate locking phase in advance, before the oil temperature rises to a temperature at which an erroneous retraction of the locking member can occur; in other words, before the oil pressure drops to a pressure at which an erroneous retraction of the locking member can occur. Consequently, inadvertent retraction of the locking member and erroneous displacement of the relative rotational phase can be effectively prevented.

In the valve timing controller relating to the present invention, preferably, the controlling section outputs the phase maintenance signal when a temperature of cooling water for cooling the internal combustion engine exceeds a predetermined temperature.

An oil temperature sensor for sensing oil temperature is provided only in certain vehicles. Whereas, a water temperature sensor for sensing temperature of cooling water (to be referred to as "water temperature" hereinafter) is provided in all vehicles. And, since there exists a correlation between the oil temperature and the water temperature, it is readily possible to calculate the oil temperature from the water temperature. Therefore, with the above-described arrangement too wherein the phase maintenance signal is outputted in triggered response to the water temperature instead of the oil temperature, no time lag occurs after the stepping-on of the accelerator until displacement of the relative rotational phase, so favorable accelerator response can be obtained. Moreover, in the case of the valve timing controller of the type wherein a plate-like locking member is caused to protrude/retract along the radial direction of the inner rotor, inadvertent retraction of the locking member and erroneous displacement of the relative rotational phase can be effectively prevented.

In the valve timing controller relating to the present invention, preferably, the controlling section outputs the phase maintenance signal when a rotational speed of the crankshaft exceeds a predetermined rotational speed.

In the case of the valve timing controller of the type wherein a plate-like locking member is caused to protrude/retract along the radial direction of the inner rotor, when the rotational speed of the crank shaft, that is, the rotational speed of the engine increases, the centrifugal force increases correspondingly. Therefore, with the above-described arrangement, as the relative rotational phase is maintained to the intermediate locking phase with releasing of the locking in advance, before the centrifugal force increases to a level at which inadvertent retraction of the locking member can occur, it is possible to effectively prevent inadvertent retraction of the locking member and erroneous displacement of the relative rotational phase.

DESCRIPTION OF EMBODIMENTS

1. First Embodiment

[Basic Configuration]

Figure 1:
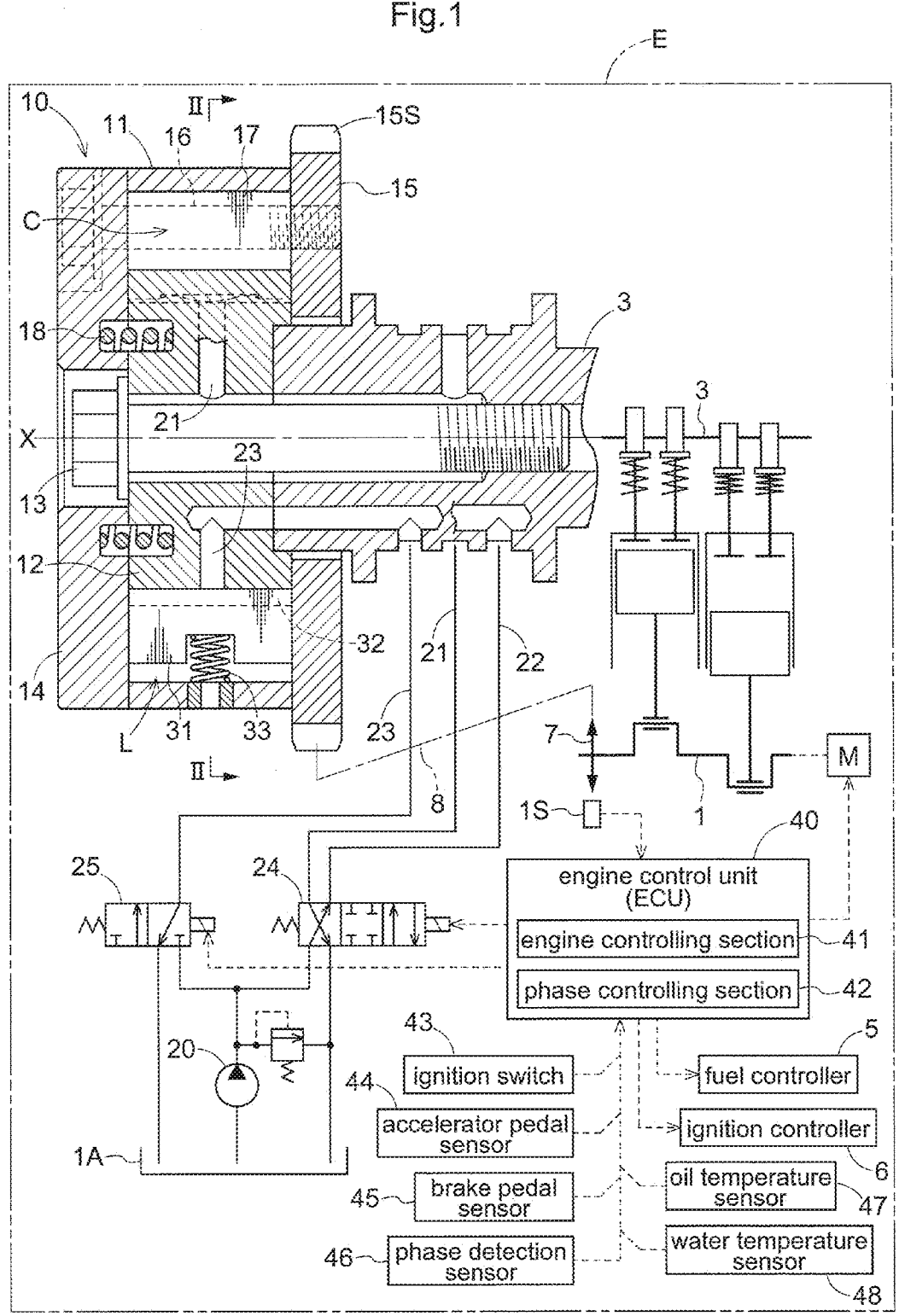
FIG. 1 is a vertical section showing a configuration of a valve timing controller relating to a first embodiment.
Figure 2:
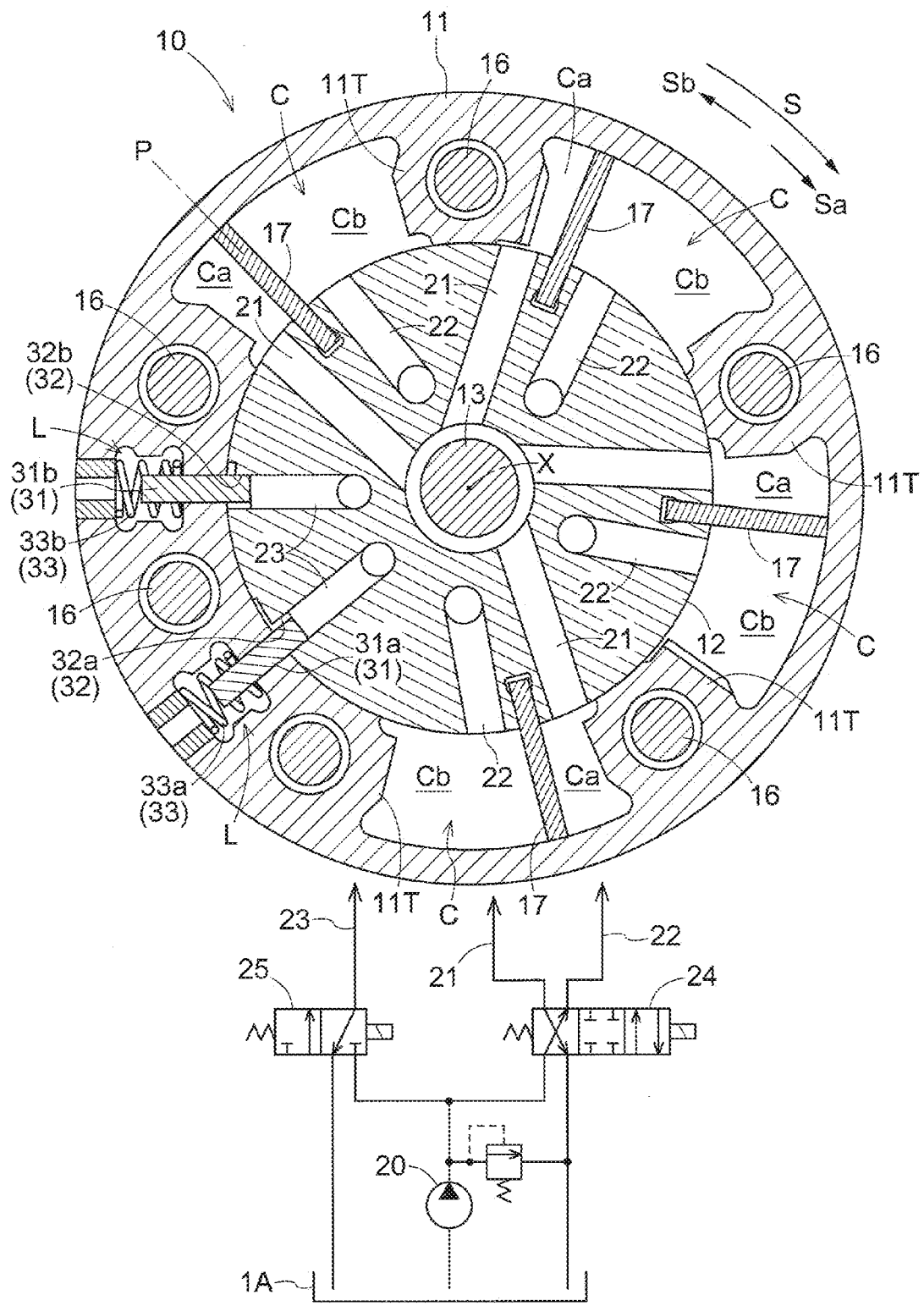
FIG. 2 is a section taken along a line II-II in FIG. 1, showing a locking state.

Next, a first embodiment of the present invention will be explained in details with reference to the accompanying drawings. FIG. 1 shows a vertical section showing a configuration of a valve timing controller relating to the first embodiment. FIG. 2 shows a section taken along a line II-II in FIG. 1. As shown in FIG. 1 and FIG. 2, an internal combustion engine control system is configured to include a valve timing controller 10 for setting opening/closing timings of an intake valve (not shown) of an engine E as an internal combustion engine, and an engine control unit (ECU) 40 for controlling the engine E. The ECU 40 is an example of a "controlling section" relating to the present invention.

The engine E shown in FIG. 1 is mounted in a vehicle such as a passenger's vehicle and includes a starter motor M for transmitting a driving rotational force to a crankshaft 1, a fuel controller 5 for controlling injection of fuel to an intake port or a combustion chamber, an ignition controller 6 for controlling ignition of an ignition plug (not shown), and a shaft sensor 1S for detecting a rotational angle and a rotational speed of the crankshaft 1. The valve timing controller 10 includes a phase detecting sensor 46 for detecting a relative rotational phase between an outer rotor 11 and an inner rotor 12.

The ECU 40 includes an engine controlling section 41 and a phase controlling section 42. The engine controlling section 41 effects automatic start and automatic stop of the engine E. The phase controlling section 42 controls the relative rotational phase and a locking mechanism of the valve timing controller 10. Controlling arrangements and modes relating to this ECU 40 will be described later herein.

[Valve Timing Controller]

As shown in FIG. 1, the valve timing controller 10 includes the outer rotor 11 as a driving-side rotary member rotated in synchronism with the crankshaft 1 of the engine E and the inner rotor 12 as a driven-side rotary member coupled via a connecting bolt 13 to a cam shaft 3 for opening/closing an intake valve (not shown) of a combustion chamber of the engine E. The inner rotor 12 is mounted coaxial with an axis X of the cam shaft 3, and this inner rotor 12 and the outer rotor 11 are rotatable relative to each other about the axis X.

The outer rotor 11 and the inner rotor 12 are mounted coaxial with the axis X and are clamped between a front plate 14 and a rear plate 15 and fastened to each other via faster bolts 16. In an outer circumference of the rear plate 15, a timing sprocket 15S is formed. The center portion of the inner rotor 12 is disposed to extend through an opening formed at the center portion of the rear plate 15 and the intake-side cam shaft 3 is connected to a rear plate 15 side end of the inner rotor 12.

As shown in FIG. 2, in the outer rotor 11, there are integrally formed a plurality of projecting portions 11T projecting toward the direction of the axis X (radially inner side). The inner rotor 12 is formed like a cylinder having an outer circumference in close contact with the projecting ends of the plurality of projecting portions 11T. With this, fluid pressure chambers C are formed between the projecting portions 11T adjacent each other in the rotational direction. In the outer circumference of the inner rotor 12, there are provided a plurality of vanes 17 as partitioning portions fitted to project toward the fluid pressure chambers C. Each fluid pressure chamber C as being partitioned by this vane 17 is divided into an advancing chamber Ca and a retarding chamber Cb along the rotational direction.

As shown in FIG. 1, across and between the inner rotor 12 and the front plate 14, there is provided a torsion spring 18 for applying an urging force until a relative rotational phase between the outer rotor 11 and the inner rotor 12 (to be referred to as "relative rotational phase" hereinafter) is displaced from a most advanced phase state to reach an intermediate locking phase P. Incidentally, the range in which the urging force of the torsion spring 18 is effective can exceed the intermediate locking phase P or can fall short of the intermediate locking phase P.

With this valve timing controller 10, as a timing chain 8 is entrained about and between an output sprocket 7 mounted on the crankshaft 1 of the engine E and the timing sprocket 15S of the outer rotor 11, the outer rotor 11 is rotated in synchronism with the crankshaft 1. Though not shown, a device having the identical configuration as the valve timing controller 10 is provided also at the front end of the exhaust side cam shaft 3, so that a rotational force is transmitted from the timing chain 8 to this device also.

As shown in FIG. 2, with the valve timing controller 10, the outer rotor 11 is rotated to a driving rotational direction S by a driving force from the crankshaft 1. Also, the rotation in which the inner rotor 12 is rotated relative to the outer rotor 11 in the same direction as the driving rotational direction S will be referred to as an advancing direction Sa and the rotational direction in the opposite direction will be referred to as a retarding direction Sb. With this valve timing controller 10, the relationship between the crankshaft 1 and the cam shaft 3 is set such that an intake compression ratio is increased in association with increase in an amount of displacement when the relative rotational phase is displaced in the advancing direction Sa and the intake compression ratio is decreased in association with increase in an amount of displacement when the relative rotational phase is displaced in the retarding direction Sb.

In the fluid pressure chamber C partitioned by the vane 17, a space for displacing the relative rotational phase in the advancing direction Sa in response to supply of work oil as a work fluid thereto is the advancing chamber Ca. Conversely, a space for displacing the relative rotational phase in the retarding direction Sb in response to supply of work oil thereto is the retarding chamber Cb. Also, a relative rotational phase when the vane 17 reaches its moving end (pivotal end about the axis X) in the advancing direction Sa will be referred to as the most advanced phase, and a relative rotational phase when the vane 17 reaches its moving end (pivotal end about the axis X) on the retarding side will be referred to as the most retarded phase.

The inner rotor 12 defines therein advancing control oil passages 21 communicated to the respective advancing chambers Ca, retarding control oil passages 22 communicated to the respective retarding chambers Cb, and lock-releasing oil passages 23 for feeding the work oil to three locking mechanisms to be described later. In this valve timing controller 10, an amount of lubricant oil reserved in an oil pan 1A of the engine E is employed as the work oil (work fluid) and this work oil is fed to the respective advancing chamber Ca or retarding chamber Cb.

[Valve Timing Controller: Locking Mechanisms]

This valve timing controller 10 includes an intermediate locking mechanism L. The intermediate locking mechanism L has a function of locking (restraining) a relative rotational phase between the outer rotor 11 and the inner rotor 12 to an intermediate locking phase P shown in FIG. 2 and releasing this locked state. The intermediate locking phase P is set at a predetermined phase between the most advanced phase where the relative rotational phase is located at the moving end in the advancing direction Sa and the most retarded phase where the relative rotational phase is located at the moving end in the retarding direction Sb; and this intermediate locking phase P is a relative rotational phase where start-up of the engine E under a low temperature condition can be effected in a favorable manner.

As shown in FIG. 2, the intermediate locking mechanism L is constituted of a locking member 31 having a first locking element 31a and a second locking element 31b, a recess portion 32 having a first recess portion 32a and a second recess portion 32b, and a spring 33 having a first spring 33a and a second spring 33b. The first locking element 31a and the second locking element 31b are formed of plate-like members of a same size and these elements are supported to be projectable/retractable relative to the outer rotor 11 to be able to approach/depart from the axis X under a posture parallel with this axis X. The first locking element 31a is caused to project toward the inner rotor 12 by an urging force of the first spring 33a, and the second locking element 31b is caused to project toward the inner rotor 12 by an urging force of the second spring 33b.

The first recess portion 32a is formed with a width slightly greater than a width of the first locking element 31a along the axial direction of the outer circumference of the inner rotor 12. And, from a retarding direction Sb end of the first recess portion 32a along the circumferential direction of the outer circumference of the inner rotor 12, there is continuously formed a shallow groove. The second recess portion 32b is formed with a width slightly greater than a width of the second locking element 31b along the axial direction of the outer circumference of the inner rotor 12. And, from a retarding direction Sb end of the second recess portion 32b along the circumferential direction of the outer circumference of the inner rotor 12, there is continuously formed a shallow groove. The depths of the groves of the first recess portion 32a and the second recess portion 32b are same.

As shown in FIG. 2, at the intermediate locking phase P, the first locking element 31a engaged in the first recess portion 32a is placed in contact with the advancing direction Sa end of the inner face of the first recess portion 32a and also the second locking element 31b engaged in the second recess portion 32b is placed in contact with the retarding direction Sb end of the inner face of the second recess portion 32b. In this way, the relative rotational phase is restrained (locked) to the intermediate locking phase, thus realizing a locked state.

[Valve Timing Controller: Oil Passage Configuration]

As shown in FIG. 2, the inner rotor 12 defines therein the lock-releasing oil passage 23 for feeding/discharging the work oil to/from the recess portion 32 (both of the first recess portion 32a and the second recess portion 32b). Via this lock-releasing oil passage 23, feeding/discharging of the work oil to/from the recess portion 32 are effected.

[Valve Timing Controller: Fluid Control Mechanism]

As shown in FIG. 1, the engine E is provided with a hydraulic pump 20 configured to extract an amount of lubricant oil in the oil pan 1A by the driving force of the engine E and feeding this oil as a work oil. The internal combustion engine control system relating to the present embodiment includes an electromagnetic operation type phase control valve 24 for feeding the work oil discharged from the hydraulic pump 20 to selected one of the advancing chamber Ca and the retarding chamber Cb of the valve timing controller 10 and an electromagnetic operation type release control valve 25 for feeding the work oil discharged from the hydraulic pump 20 to the lock-releasing oil passage 23. In particular, the hydraulic pump 20, the phase control valve 24, the release control valve 25 and the oil passage to/from which the work oil is fed/discharged, together constitute a fluid control mechanism of the valve timing controller 10.

The phase control valve 24 is configured as an electromagnetic valve selectively operable to an advancing position, a retarding position and a neutral position in association with change in its spool position caused by a control signal. More particularly, at the advancing position, work oil discharged from the hydraulic pump 20 is communicated via the advancing control oil passage 21 to be fed to the advancing chamber Ca and also work oil present in the retarding chamber Cb is discharged via the retarding oil passage 22. At the retarding position, work oil discharged from the hydraulic pump 20 is communicated via the retarding control oil passage 22 to be fed to the retarding chamber Cb and also work oil present in the advancing chamber Ca is discharged via the advancing oil passage 21. At the neutral position, no oil is fed/discharged to/from either the advancing chamber Ca or the retarding chamber Cb. Incidentally, when electric power is supplied by 100% duty ratio to the phase control valve 24, this phase control valve 24 is rendered into the advancing position. In response to stop of electric power supply thereto, the phase control valve 24 is rendered into the retarding position.

Figure 3:
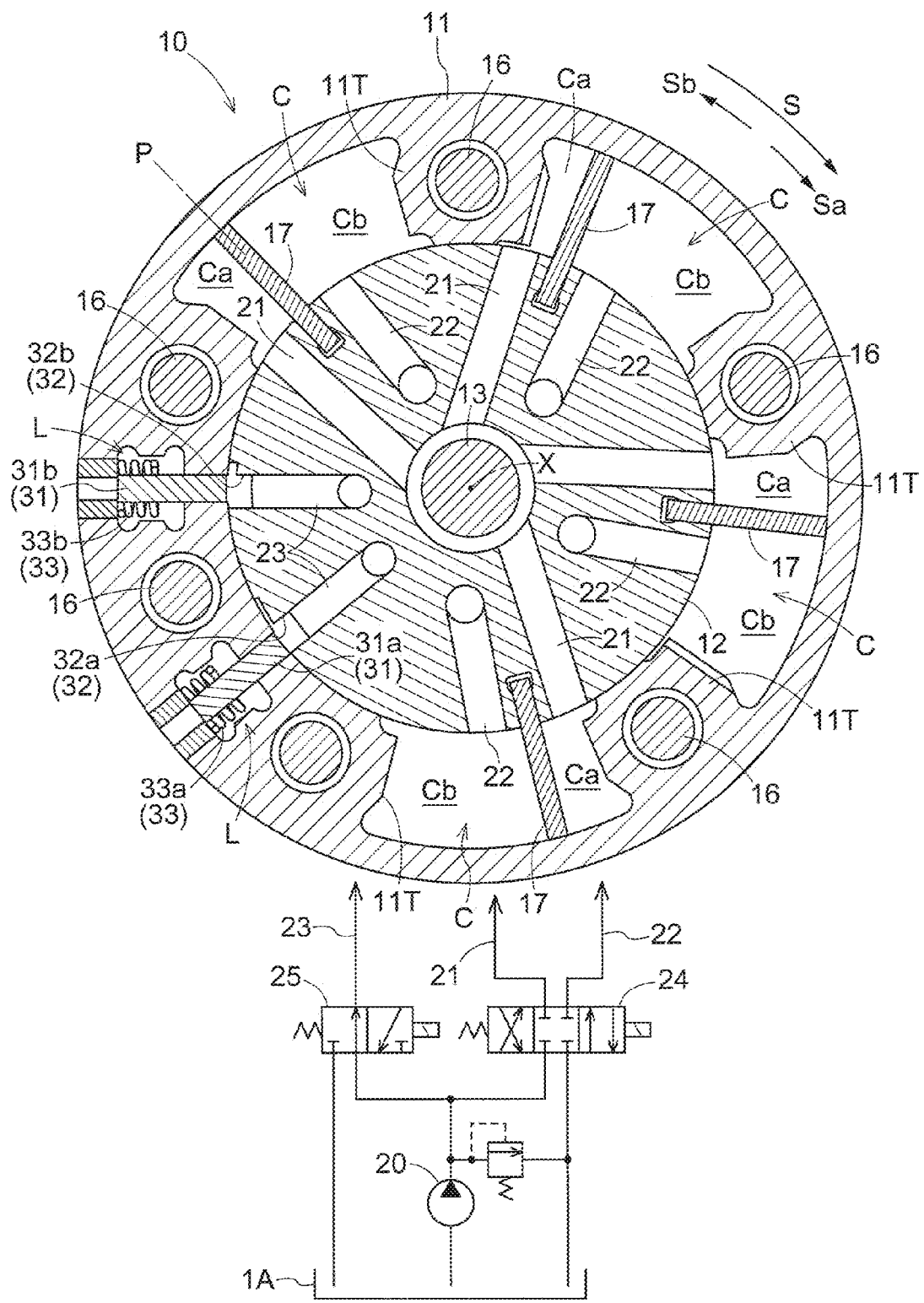
FIG. 3 is a horizontal section showing a lock-releasing state of the valve timing controller.

The release control valve 25 is configured as an electromagnetic valve selectively operable to an unlocking position and a locking position in response to a control signal from the ECU 40. More particularly, at the unlocking position, work oil discharged from the hydraulic pump 20 is communicated via the lock-releasing oil passage 23 to be fed to the recess portion 32. At the locking position, work oil is discharged from the recess portion 32 via the lock-releasing oil passage 23, whereby the locking member 31 (both of the first locking element 31a and the second locking element 31b) becomes engageable in the recess portion 32. Incidentally, when electric power is supplied to the release control valve 25, this release control valve 25 is rendered into the locking position. And, the valve 25 is rendered into the un-locking position in response to stop of electric power supply thereto. FIG. 3 shows a section illustrating a state in which the release control valve 25 is rendered to the un-locking position and the locking of the valve timing controller 10 is released.

[Controlling Configuration]

As shown in FIG. 1, the ECU 40 receives signal inputs from a shaft sensor 1S, an ignition switch 43, an accelerator pedal sensor 44, a brake pedal sensor 45, a phase detection sensor 46, an oil temperature sensor 47, and a water temperature sensor 48. On the other hand, the ECU 40 outputs signals for controlling the starter motor M, the fuel controller 5 and the ignition controller 6, respectively and outputs also signals for controlling the phase control valve 24 and the release control valve 25.

The ignition switch 43 is configured as a switch for activating the internal combustion engine control system. When this switch 43 is turned ON, the engine E is started. When the switch 43 is turned OFF, the engine E is stopped. The accelerator pedal sensor 44 detects a step-on amount of the accelerator pedal (not shown). The brake pedal sensor 45 detects a step-on amount of a brake pedal (not shown). The oil temperature sensor 47 detects a temperature of oil flowing in the vicinity of an oil filter (not shown). The water temperature sensor 48 detects a temperature of water flowing inside the engine E.

The engine controlling section 41 realizes starting and stopping of the engine E based on an operation on the ignition switch 43. The phase controlling section 42 effects a timing control of the intake valve by the valve timing controller 10 during operation of the engine E, sets a relative rotational phase of the valve timing controller 10 based on a situation when the engine E is stopped and realizes shift to the intermediate locking state by the intermediate locking mechanism L.

[Controlling Modes]

Figure 4:
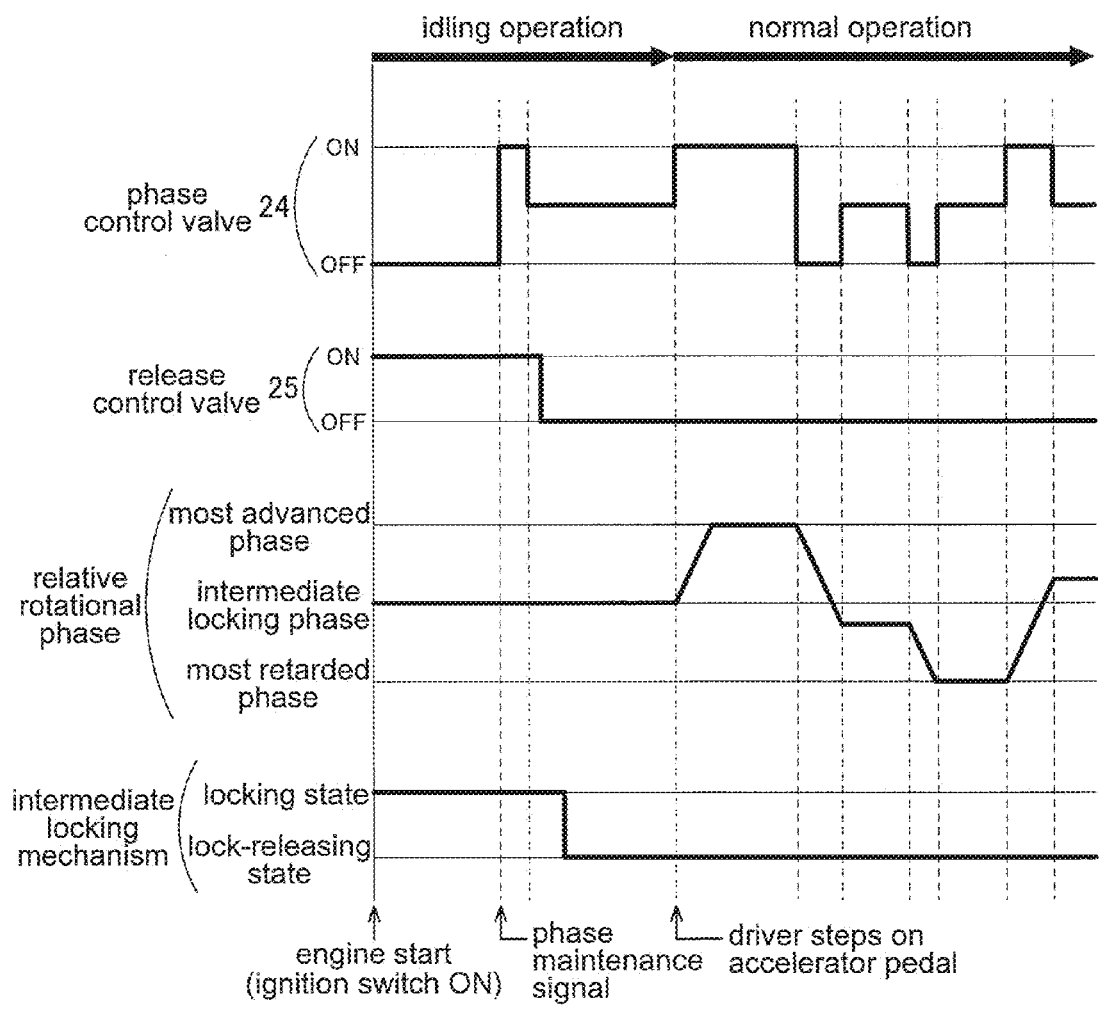
FIG. 4 is a timing chart illustrating control effected by the valve timing controller.

Next, controlling modes of the internal combustion engine control system relating to the present embodiment will be explained. Incidentally, FIG. 4 shows a timing chart illustrating control of the phase control valve 24, control of the release control valve 25, displacement of the relative rotational angle and state of the intermediate locking mechanism L in the period from start to a normal operation of the engine E.

When the engine E is stopped at a low temperature, the relative rotational phase is locked to the intermediate locking phase P by the intermediate locking mechanism L. When the engine E is stopped at a low temperature, work oil is discharged from the advancing chamber Ca and the retarding chamber Cb. Also, although the release control valve 25 is kept at the un-locking position, work oil is discharged from the recess portion 32. And, the first locking element 31a engaged in the first recess portion 32a is placed in contact with the advancing direction Sa end of the inner face of the first recess portion 32a and also the second locking element 31b engaged in the second recess portion 32b is placed in contact with the retarding direction Sb end of the inner face of the second recess portion 32b.

Under the above-described condition, if the ignition switch 43 is manually turned ON, the engine controlling section 41 effects rotational driving of the starter motor M, fuel supply to the fuel chamber by the fuel controller 5 and ignition of the ignition plug by the ignition controller 6. With this, the engine E is started, thus starting an idling operation. At this point, simultaneously with the ON operation of the ignition switch 43, power is supplied to the release control valve 25, whereby this release control valve 25 is switched to the locking position and the state of the intermediate locking phase P by the intermediate locking mechanism L is maintained. In this way, since the relative rotational phase can be restrained by the intermediate locking mechanism L to the intermediate locking phase P between the most advanced phase and the most retarded phase, the engine E can be started in a sable manner.

The phase controlling section 42 maintains the retarding position by continuing the stop of power supply to the phase control valve 24, thus effecting a retarding control. In this, the hydraulic pump 20 has already been put into operation to discharge work oil and supply this oil to the retarding chamber Cb. In a normal start control, the engine E will be started in a situation where the oil temperature is low and viscosity of the oil is high. As the idling operation is continued, the oil temperature rises and the viscosity drops correspondingly. And, when the oil temperature sensor 47 detects arrival of the oil temperature at the predetermined temperature, based on a detection signal from this oil temperature sensor 47, the ECU 40 outputs the phase maintenance signal. Incidentally, the "predetermined temperature" refers to a temperature at which the relative rotational phase can be maintained within a predetermined angle range by the oil pressure acting on the vane 17, even when the locking state is released. Details of this will be described later herein.

Based on the phase maintenance signal, the phase controlling section 42 confirms with lapse of a predetermined time period that filling of work oil in the retarding chamber Cb is completed and then the phase controlling section 42 effects 100% duty ratio power supply control to the phase control valve 24. With this, the spool is switched to the advancing position and supply of work oil to the advancing chamber Ca is started. After lapse of a predetermined time period, the phase controlling section 42 determines that the advancing chamber Ca has been filled with the work oil and effects 50% duty ratio power supply to the phase control valve 24, thus switching the spool to the neutral position. With this, the condition of the advancing chamber Ca and the retarding chamber Cb filled with the work oil is maintained. Incidentally, in the instant embodiment, filling of the advancing chamber Ca and the retarding chamber Cb is determined based on lapse of the predetermined time period. However, it is needless to say that the filling can be determined by an oil pressure sensor or any other method than the above.

After the phase control valve 24 is switched to the neutral position, the phase control valve 42 effects control for stopping electric power supply to the release control valve 25. With this stopping of power supply, the release control valve 25 is switched from the locking position to the un-locking position, whereby work oil is supplied to the lock-releasing oil passage 23.

As the work oil supplied to the lock-releasing oil passage 23 is supplied to the recess portion 32, the work oil directly affects the locking member 31 to cause this member 31 to be retracted from the recess portion 32. With this, the locking state of the intermediate locking mechanism L is released to realize a lock-releasing state. In this, the advancing chamber Ca and the retarding chamber Cb hold respectively therein in a sealed state work oil having an oil temperature of the predetermined temperature or higher, so due to the oil pressure applied by the work oil within the advancing chamber Ca and the retarding chamber Cb on the vane 17, the relative rotational phase is maintained within a predetermined angle range from the intermediate locking phase P which range is predetermined by designing to be e.g. within ±3 degrees CA (crank angle). Incidentally, when the advancing chamber Ca and the retarding chamber Cb are maintained under the sealed state by the phase control valve 24 (the neutral position shown in FIG. 3), if there occurs shortage of work oil inside at least one of the advancing chamber Ca and the retarding chamber Cb, the phase controlling section 42 controls the phase control valve 24 to replenish the deficiency. Therefore, although the intermediate locking mechanism L is under the lock-releasing state, the idling operation at the intermediate locking phase P will be continued. Meanwhile, the maintenance of the relative rotational phase to the intermediate locking phase P under the lock-releasing state means not only no displacement of the relative rotational phase from the intermediate locking phase P, but also displacement of the intermediate locking phase P within the above-described predetermined angle range.

During an idling operation wherein the intermediate locking mechanism L is under the lock-releasing state and the intermediate locking phase P is maintained, if the driver steps on the accelerator pedal to effect a normal operation, the relative rotational phase will be displaced immediately from the intermediate locking phase P to the advancing side. Therefore, after the stepping-on of the accelerator pedal until displacement of the relative rotational phase from the intermediate locking phase P to the advancing side, that is, until the vehicle starts acceleration, no time lag occurs and favorable accelerator response can be obtained.

Further, when the oil temperature exceeds the predetermined temperature, in other words, before the oil pressure drops to a level at which erroneous retraction of the locking member 31 can occur, the locking state is released with keeping the intermediate locking phase P. Therefore, it is possible to effectively prevent the erroneous operation of displacement of the relative rotational phase due to inadvertent retraction of the locking member 31 from the recess portion 32 against the urging force of the spring 33 by a centrifugal force generated in association with rotation of the engine E.

In the instant embodiment, the ECU 40 outputs the phase maintenance signal based on an oil temperature of the work oil. However, the configuration is not limited thereto. For instance, the ECU 40 may output the phase maintenance signal based on a water temperature of cooling water detected by the water temperature sensor 48. This is because the oil temperature sensor 47 is provided only in certain vehicles whereas the water temperature sensor 48 is provided in all vehicles and it is readily possible to calculate the oil temperature from the water temperature, based on the correlation existent between the oil temperature and the water temperature.

Further alternatively, the ECU 40 may output the phase maintenance signal based on a rotational speed of the engine E, i.e. a rotational speed of the crankshaft 1. This is because of the following reasons. Firstly, as the rotational speed of the engine E increases, the centrifugal force increases correspondingly, so that there is higher possibility of occurrence of erroneous operation of displacement of the relative rotational phase due to inadvertent retraction of the locking member 31 from the recess portion 32 against the urging force of the spring 33 and the shearing force acting on the locking member 31. Secondly, as there exists positive correlation between the rotational speed of the engine E and the discharging force of the hydraulic pump 20, when the rotational speed of the engine E increases, the filing of the advancing chamber Ca and the retarding chamber Cb with the work oil will be completed within a correspondingly shorter time period.

2. Second Embodiment

Next, a second embodiment of the present invention will be described in details with reference to the accompanying drawings. In the following description of this embodiment, the same portions as those of the first embodiment will be provided with the same reference marks/numerals and explanation thereof will be omitted.

Figure 5:
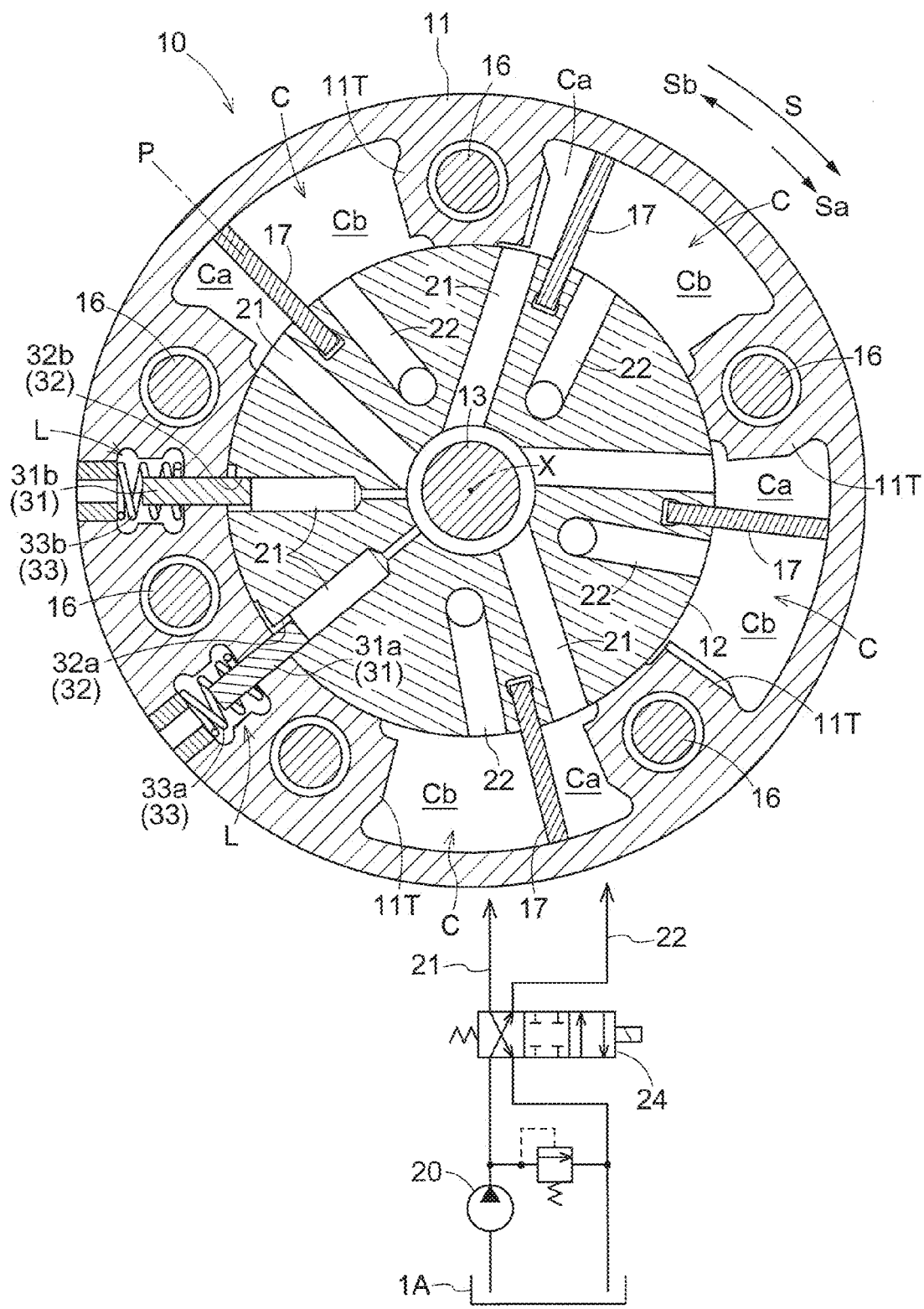
FIG. 5 is a horizontal section showing a locking state of a valve timing controller relating to a second embodiment.
Figure 6:
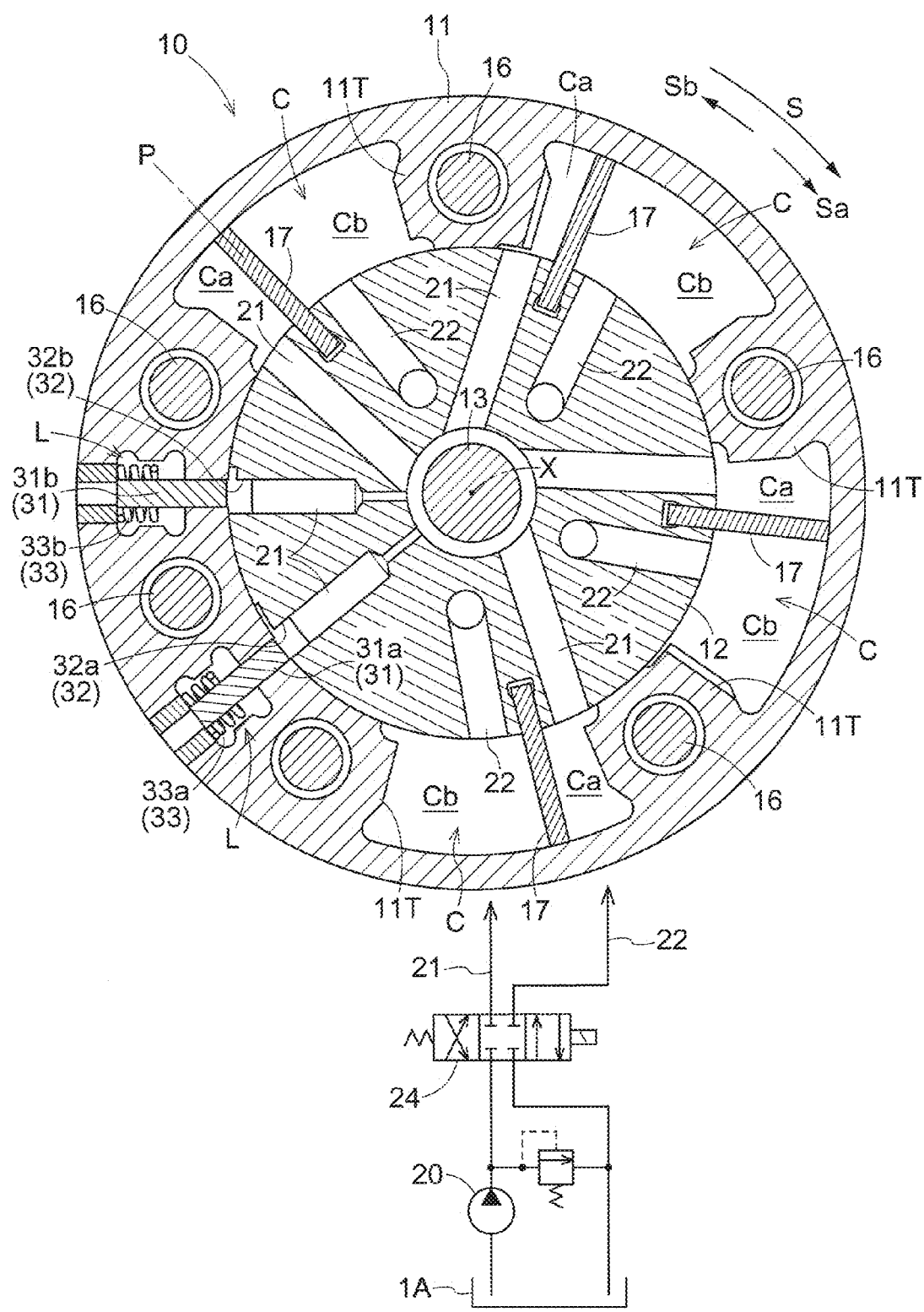
FIG. 6 is a horizontal section showing a lock-releasing state of the valve timing controller relating to the second embodiment.
Figure 7:
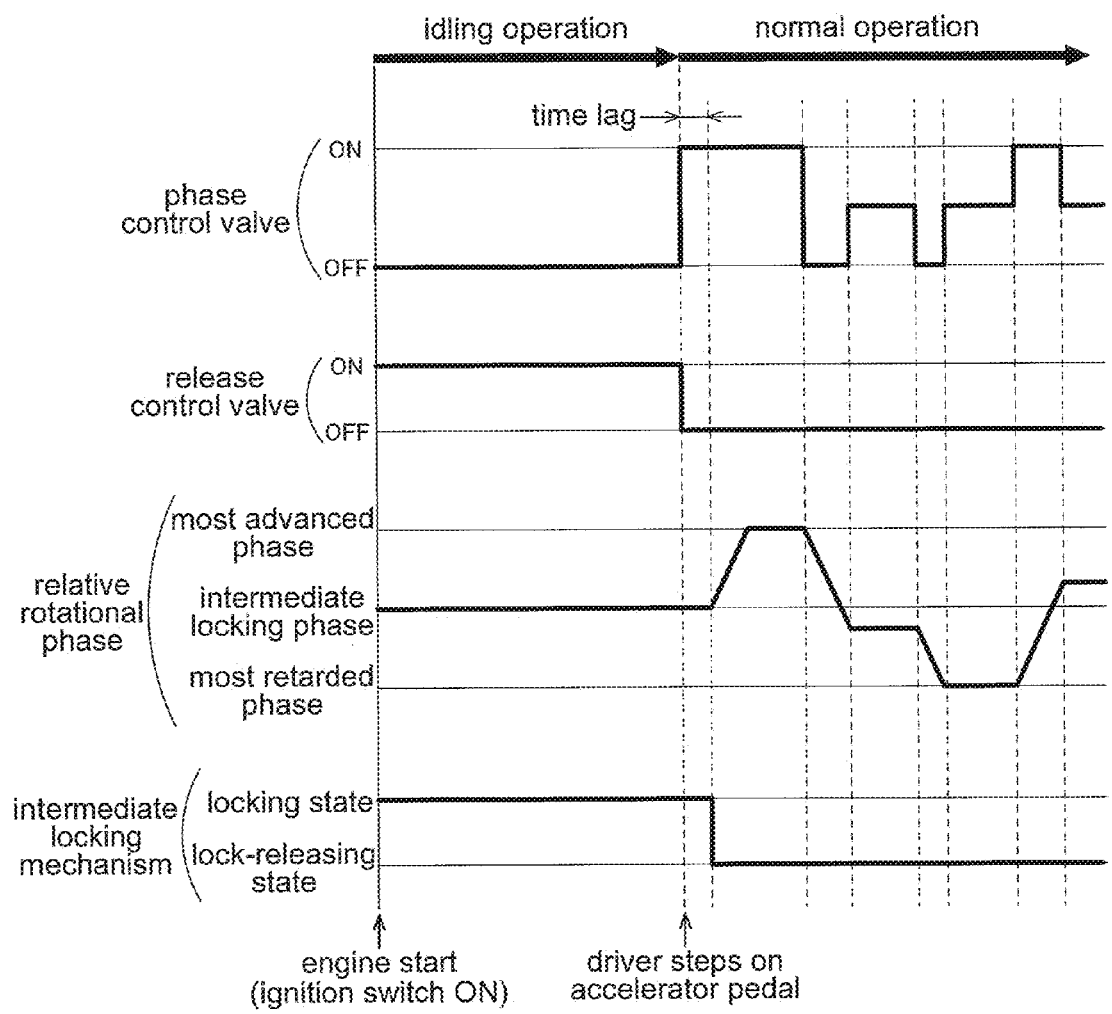
FIG. 7 is a timing chart illustrating control effected by a conventional valve timing controller.

FIG. 5 and FIG. 6 shows a horizontal section of a valve timing controller 10 relating to this embodiment. As shown in FIG. 5 and FIG. 6, this valve timing controller 10 lacks the lock-releasing oil passages 23 and the release control valve 25 and is configured such that work oil is fed/discharged to/from the recess portion 32 via the advancing control oil passages 21. The advancing control oil passage 21 communicated to the recess portion 32 has a portion thereof formed with a reduced passage cross section. This arrangement is provided for delaying the supply of work oil to the recess portion 32 relative to the supply thereof to the advancing chamber Ca, so that the locking member 31 may be retracted from the recess portion 32 for releasing the locking state after filling of work oil in the advancing chamber Ca. Thereafter, the phase control valve 24 is switched over to the neutral position. Also with this alternative configuration of the valve timing controller 10, the relative rotational phase can be maintained within a predetermined angle range from the intermediate locking phase P which range is predetermined by designing, under the lock-releasing state.

The two embodiments described above disclose the valve timing controller 10 of the type in which the plate-like locking member 31 is caused to protrude/retract along the radial direction of the inner rotor 12 toward the recess 32 defined in this inner rotor 12. However, the configuration is not limited thereto. It is needless to say that the configuration may be applied to a valve timing controller 10 of a pin type in which the locking member 31 is caused to protrude/retract along the axial direction of the cam shaft 3. With such pin type valve timing controller 10, there occurs no problem of erroneous displacement of the relative rotational phase due to inadvertent retraction of the locking member 31 from the recess portion 32 to release the lock when the centrifugal force associated with rotation of the engine E overwhelms the urging force of the spring 33 which provides this urging force to the locking member 31.

INDUSTRIAL APPLICABILITY

The present invention is applicable to a valve timing controller for controlling a relative rotational phase of a driven-side rotary member relative to a driving-side rotary member rotated in synchronism with a crankshaft of an internal combustion engine.

REFERENCE SIGNS LISTS 1 crankshaft
3 cam shaft
10 valve timing controller
11 outer rotor (driving-side rotary member)
12 inner rotor (driven-side rotary member)
17 vane (partitioning portion)
31 locking member
32 recess portion
40 ECU (control unit)
C fluid pressure chamber
Ca advancing chamber
Cb retarding chamber
E engine (internal combustion engine)
L intermediate locking mechanism
P intermediate locking phase

The invention claimed is:
1. A valve timing controller comprising:
a driving-side rotary member rotated in synchronism with a crankshaft of an internal combustion engine;
a driven-side rotary member mounted on a same shaft as the driving-side rotary member and rotated in synchronism with a valve opening/closing cam shaft of the internal combustion engine;
a fluid pressure chamber formed by the driving-side rotary member and the driven-side rotary member;
an advancing chamber and a retarding chamber formed as the fluid pressure chamber is partitioned by a partitioning portion provided in at least one of the driving-side rotary member and the driven-side rotary member;
an intermediate locking mechanism including a locking member accommodated in at least one rotary member of the driving-side rotary member and the driven-side rotary member and projectable/retractable to/from the other rotary member of the driving-side rotary member and the driven-side rotary member, and a recess portion formed in the other rotary member to be engageable with the locking member when this locking member projects, the intermediate locking mechanism being switchable between a locking state wherein a relative rotational phase of the driven-side rotary member relative to the driving-side rotary member is restrained to an intermediate locking phase between a most retarded phase and a most advanced phase and a lock-releasing state wherein the restraint is released as the locking member retracts from the recess portion; and a controlling section for controlling supplying or discharging of the work fluid to or from the advancing chamber and supplying or discharging of the work fluid to or from the retarding chamber;

wherein when the controlling section outputs a phase maintenance signal indicating a phase maintaining state which allows control for maintaining the relative rotational phase within a predetermined angle range by the work fluid present in the advancing chamber and the retarding chamber under the locking state, based on the phase maintenance signal and with lapse of a predetermined period, the controlling section confirms that the advancing chamber and the retarding chamber have been filled with the work fluid and effects control to stop the supplying and the discharging of the work fluid to or from the retarding chamber and the advancing chamber with the relative rotational phase being the intermediate locking phase and instructs switchover from the locking state to the lock-releasing state, whereby the intermediate locking mechanism is switched over to the lock-releasing state and the relative rotational phase is maintained to the intermediate locking phase.

2. The valve timing controller according to claim 1, wherein the controlling section outputs the phase maintenance signal when a temperature of the work fluid exceeds a predetermined temperature.

3. The valve timing controller according to claim 1, wherein the controlling section outputs the phase maintenance signal when a temperature of cooling water for cooling the internal combustion engine exceeds a predetermined temperature.

4. The valve timing controller according to claim 1, wherein the controlling section outputs the phase maintenance signal when a rotational speed of the crankshaft exceeds a predetermined rotational speed.

* * * * *